April 21, 1925.
E. P. STEVENS
1,534,472
OPEN HEARTH FURNACE ROOF
Filed Nov. 20, 1922 2 Sheets-Sheet 1
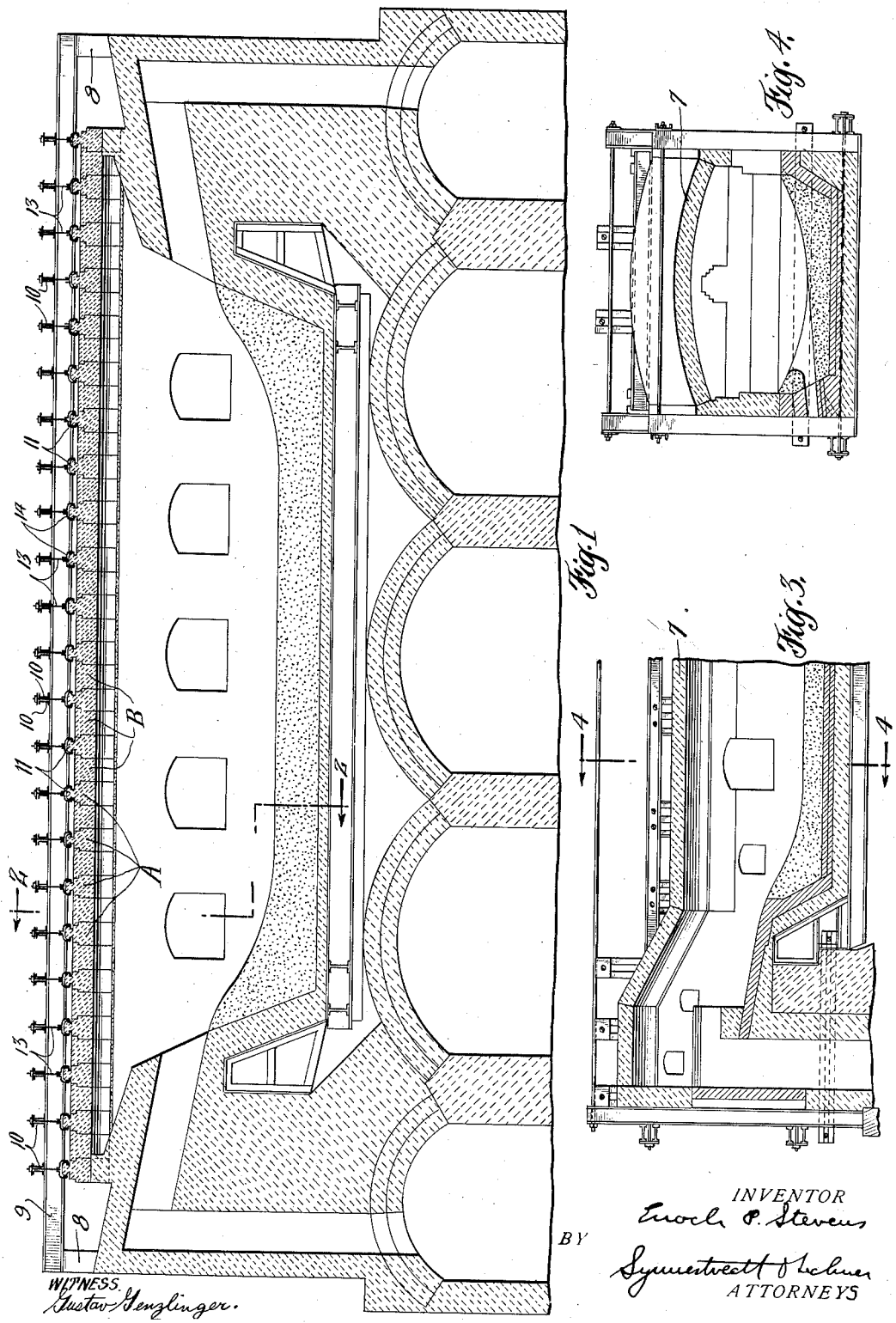
INVENTOR
Enoch P. Stevens
BY
ATTORNEYS
WITNESS.
Gustav Genzlinger.

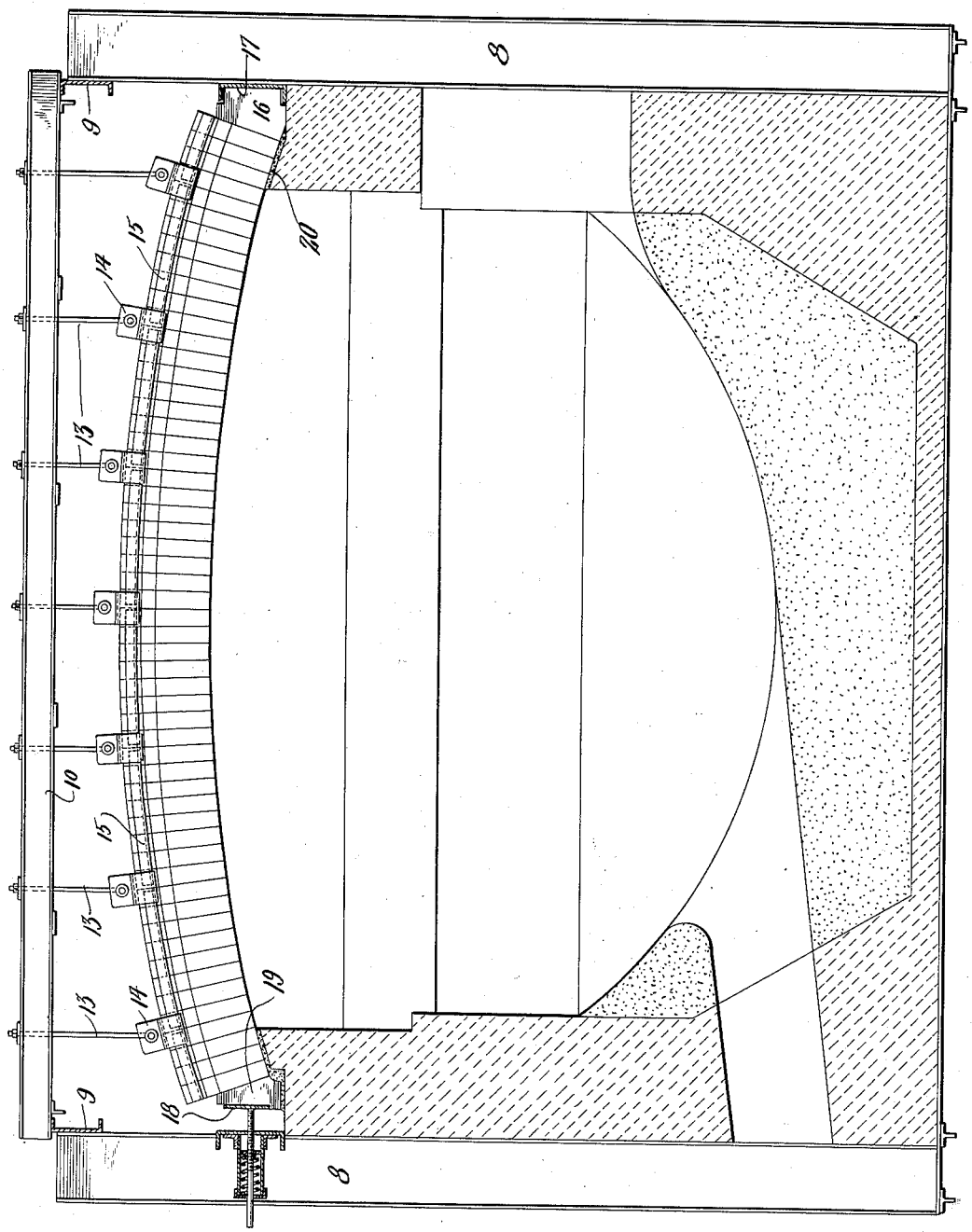

Patented Apr. 21, 1925.

1,534,472

UNITED STATES PATENT OFFICE.

ENOCH P. STEVENS, OF CHICAGO, ILLINOIS; MARY ANN STEVENS EXECUTRIX OF SAID ENOCH P. STEVENS, DECEASED.

OPEN-HEARTH-FURNACE ROOF.

Application filed November 20, 1922. Serial No. 602,019.

*To all whom it may concern:*

Be it known that I, ENOCH P. STEVENS, a citizen of the United States, residing at Chicago, in the county of Cook and State of Illinois, have invented certain new and useful Improvements in Open-Hearth-Furnace Roofs, of which the following is a specification.

This invention relates primarily to open hearth furnace roof constructions and one of the principal objects of my invention is to overcome certain difficulties and disadvantages incident to the standard forms of roof construction used heretofore in open hearth furnaces and more particularly hereinafter pointed out.

The objects and advantages to which my invention is directed are obtained by means of a construction which I have illustrated in preferred form in the accompanying drawings, wherein:

Fig. 1 is a longitudinal section through an open hearth furnace embodying my improvements. Fig. 2 is a cross section of Fig. 1, taken on the line 2—2 thereof, on an enlarged scale; Fig. 3 is a fragmentary longitudinal section illustrating a standard form of construction heretofore employed; and Fig. 4 is a cross section taken on the line 4—4 of Fig. 3.

Referring now to Figs. 3 and 4, it will be seen that the roof 7 is of the "sprung" type and may be considered as a more or less solid, permanent structure, bearing on the side and end walls, an arrangement necessitating a rather complicated construction of supporting structural work, braced and tied together because the thrust of the roof in expanding is transmitted to the side and end walls of the furnace proper. In addition, the roof, being of the sprung type, is necessarily formed on a comparatively small radius; i. e., there is an appreciable crown. Since, for a time at least, the scrap charged into the furnace must be melted largely by the radiant heat of the refractories, the closer the body of the roof to the charge and the greater the radius, the more effective will be the operation of the furnace in this respect. Furthermore, the roof eats out and becomes thin on the tapping sides of the furnace, which is productive of serious results on expansion and contraction. The weakening of the roof incident to this eating out and thinning results in buckling so that it is not at all infrequent that the roof structure collapses and entire charges spoiled. In accordance with my invention, I propose to provide a sectional form of roof and means whereby the same may be applied to an open hearth furnace. While, broadly speaking, sectional roof constructions are old in some forms of furnace construction, heretofore, in so far as I am aware, a sectional form of roof has never been applied to open hearth furnaces, the standard roof construction employed in such types being in all substantial respects like that shown in Figs. 3 and 4.

In carrying out my invention I provide a plurality of upright buck stays 8, arranged at suitable intervals along the opposite sides of the furnace. The upper ends of the buck stays on each side of the furnace are tied together by a longitudinally extending channel or other suitable commercial section 9 and carried on these longitudinal supporting members are a plurality of cross supporting members 10, also preferably of channel shape and arranged in pairs and suitably secured to the members 9.

The roof is supported from the cross members 10, and these members in addition serve to tie together the side frames which are comprised of the buck stays 8 and the members 9.

A roof is composed of a plurality of rows of bricks A which have T-shaped heads 11 on their upper ends. Each row of these bricks is supported by a plurality of hangers 13 suspended from the respective pairs of cross members 10, the hangers being provided with clips 14 adapted to engage stringer strips 15, which in turn engage the T heads of the bricks.

The bricks A are shouldered, as will be clear on inspection of Fig. 1 and supported between the rows of the bricks A are rows of T-shaped bricks B, the heads of which rest upon the shoulders of adjacent rows of the bricks A. At one end, the rows of bricks bear against skew bricks or blocks 16 fitted into the channel member 17, and at the opposite end spring pressed plungers 18 press the bricks or blocks 19 yieldingly against the rows. A sand or other suitable form of joint 20 is provided between the side and end walls and the rows of bricks.

By this arrangement the rows of bricks are supported for expansion and contraction and the bricks constituting each row are held against separation. The whole roof structure can expand both laterally and longitudinally without imposing the great thrust incident to the standard form of roof construction heretofore employed, and it will be noted that the supporting structure is greatly simplified. In addition, a flat roof or a roof formed on a relatively large radius can be employed, with superior and more effective subjection of the charge to the radiant heat. In addition, the eating out and thinning of the bricks on the tapping side will not produce the detrimental results hereinbefore noted and the roof will not crumble and fall into the bath of metal. It is also possible to renew badly worn bricks without replacing the other bricks or even disturbing any save those immediately adjacent and the failure and dropping out of one brick will not result in precipitating sections of the roof into the bath. Thus, not only from an economical but also an operating standpoint, the improvements are greatly superior to the forms heretofore employed.

In one sense, the supporting framework for the arch may be said to be a "supporting cradle" from which the courses of the roof are hung, with a floating seal between the furnace proper and the roof and with the bricks so suspended from the cradle that expansion and contraction can take place without imposing material thrust either on the cradle or the furnace proper and consequently without subjecting the tiles of the arch themselves to any material pressure. The cradle can thus be made to straddle the furnace, as shown, or rest thereupon.

What I claim is:

1. An arched furnace roof structure comprising in combination with the furnace walls, a supporting cradle and a plurality of roof tile suspended therefrom in the arc of the arch with freedom of expansion and contraction without imposing material thrusts on the furnace walls or material pressure on the tiles.

2. An arched furnace roof structure comprising in combination with the furnace walls, a supporting cradle, a plurality of roof tile suspended therefrom in the arc of the arch with freedom of expansion and contraction without imposing material thrusts on the furnace walls or material pressure on the tiles and means at a side of the arc for yieldingly pressing the tiles together during expansion and contraction.

3. A roof structure for an open hearth furnace comprising in combination with the furnace walls, a supporting cradle, a plurality of roof tile suspended therefrom with freedom of expansion and contraction without imposing material thrusts on the furnace walls or material pressure on the tiles, and means at a side of the roof for yieldingly pressing the tiles together during expansion and contraction.

4. In an open hearth furnace, the combination of an overhead supporting means extending longitudinally of the furnace, and rows of roof bricks suspended therefrom and spaced apart, and other rows of bricks between said first rows and carried thereby, together with yielding means compensating for contraction and expansion in a direction longitudinally of the rows.

5. In an open hearth furnace, the combination of buck stays on opposite sides of the furnace, longitudinally extending supporting members secured to the upper ends of the buck stays, cross supporting members carried by the longitudinal supporting members, and rows of roof bricks suspended from the cross supporting members.

6. In an open hearth furnace, the combination of buck stays on opposite sides of the furnace, longitudinally extending supporting members secured to the upper ends of the buck stays, cross supporting members carried by the longitudinal supporting members, and rows of roof bricks suspended from the cross supporting members, together with other rows of roof bricks between the first mentioned rows and carried thereby.

7. In an open hearth furnace, the combination of buck stays on opposite sides of the furnace, longitudinally extending supporting members secured to the upper end of the buck stays, cross supporting members carried by the longitudinal supporting members, and rows of roof bricks suspended from the cross supporting members, said cross members serving to tie the buck stays against lateral spreading.

In testimony whereof, I have hereunto signed my name.

ENOCH P. STEVENS.